(12) United States Patent
Shao et al.

(10) Patent No.: US 11,059,023 B1
(45) Date of Patent: Jul. 13, 2021

(54) METHOD FOR PREPARING ACID-RESISTANT ZR-MOF MATERIAL WITH SELECTIVE ADSORPTION OF HEXAVALENT CHROMIUM

(71) Applicant: Nanchang Hangkong University, Nanchang (CN)

(72) Inventors: Penghui Shao, Nanchang (CN); Zichao Hu, Nanchang (CN); Xubiao Luo, Nanchang (CN); Zhen Yu, Nanchang (CN); Liming Yang, Nanchang (CN); Hui Shi, Nanchang (CN); Kai Yu, Nanchang (CN)

(73) Assignee: Nanchang Hangkong University, Nanchang (CN)

( * ) Notice: Subject to any disclaimer, the term of this patent is extended or adjusted under 35 U.S.C. 154(b) by 0 days.

(21) Appl. No.: 16/990,017

(22) Filed: Aug. 11, 2020

(30) Foreign Application Priority Data

Apr. 16, 2020 (CN) .......................... 202010302213.5

(51) Int. Cl.
| | |
|---|---|
| *B01J 20/22* | (2006.01) |
| *B01J 20/30* | (2006.01) |
| *C07F 7/00* | (2006.01) |
| *C02F 1/28* | (2006.01) |
| *C02F 101/22* | (2006.01) |

(52) U.S. Cl.
CPC .......... *B01J 20/226* (2013.01); *B01J 20/3085* (2013.01); *C02F 1/288* (2013.01); *C07F 7/003* (2013.01); *C02F 1/281* (2013.01); *C02F 1/285* (2013.01); *C02F 2101/22* (2013.01)

(58) Field of Classification Search
None
See application file for complete search history.

(56) References Cited

PUBLICATIONS

He et al., Crystal Growth & Design (2018), 18(9), pp. 5573-5581.*
Manousi et al., Molecules (2019), 24(24), pp. 123-143.*

* cited by examiner

*Primary Examiner* — Brian J Davis
(74) *Attorney, Agent, or Firm* — Baker & Hostetler LLP; Toni-Junell Herbert

(57) ABSTRACT

Disclosed is a method for preparing an acid-resistant Zr-metal-organic framework (Zr-MOF) material with selective adsorption of hexavalent chromium, which is specifically a method for preparing a MOF material with selective adsorption of hexavalent chromium. The present invention aims to solve the technical problems that the existing MOFs have poor water stability, is unstable in an aqueous solution, and therefore may structurally collapse. In addition, the micropore characteristics of most MOFs have affected the mass transfer rate of the adsorbate, which in turn limits the industrial application thereof. The MOF of the present invention has excellent water stability and acid resistance, showing a strong adaptability and great potential in treating mostly acidic industrial wastewater. As a new functional material for water treatment, the MOF has optimal selective adsorption capacity and a desirable adsorption capacity for hexavalent chromium in water, which improves the recycling and later resource utilization.

5 Claims, 4 Drawing Sheets

PRIOR ART

METHOD FOR PREPARING ACID-RESISTANT ZR-MOF MATERIAL WITH SELECTIVE ADSORPTION OF HEXAVALENT CHROMIUM

CROSS-REFERENCE TO RELATED APPLICATIONS

This application is a non-provisional utility application, which claims priority to CN 202010302213.5 filed Apr. 16, 2020, the contents of which application is herein incorporated by reference.

TECHNICAL FIELD

The present invention relates to a method for preparing an acid-resistant metal-organic framework (MOF) material with selective adsorption of hexavalent chromium.

BACKGROUND

With the development of the industry and the processing limitations by the current technology and costs, the production process will inevitably be accompanied by various forms of water pollution. Among them, the problem of chromium-containing wastewater has become increasingly serious in recent years with the rise of electroplating, chemical industry, leather-making and other industries. Thus, the treatment of such water pollution has gradually attracted the attention in the environmental field. In such water, chromium mainly exists in two forms of chromate, namely hexavalent chromium and trivalent chromium. Among them, the hexavalent chromium is more toxic, about 100 times of the trivalent chromium, and it is a strong mutagenic substance, can cause lung cancer and nasopharyngeal cancer. Therefore, the treatment of the hexavalent chromium is particularly important. In many water treatment processes, the adsorption method is widely used in industry due to its simplicity, high efficiency, low cost, good regeneration, and recycling of adsorbates. In the evolution of the adsorption technology, the history of the development is basically equivalent to the development history of the adsorption materials. Therefore, the design of water treatment adsorption materials targeting to the actual industrial water quality is of a great significance to the development of the adsorption technology.

A MOF is a nanoporous material formed by coordination of metal ions and organics. The diverse construction methods and the adjustable structures of the MOFs allow same to have a good development potential in catalysis, optics, drug carriers, etc. At the same time, the porosity, high specific surface area and other characteristics the MOF's also enable same to have the potential of being an excellent adsorption material.

So far, there have been few cases of applying MOF materials in the field of water treatments, because the MOFs generally have poor water stability, is unstable in an aqueous solution, and therefore may structurally collapse. In addition, the micropore characteristics of most MOFs have affected the mass transfer rate of the adsorbate, which in turn limits the industrial application thereof. Therefore, it is of a great practical significance to prepare an MOF material which has good water stability, acid resistance, mesopores, and can selectively adsorb hexavalent Cr for metal recycling.

SUMMARY

The present invention provides a method for preparing an acid-resistant Zr-MOF material with selective adsorption of hexavalent chromium, so as to solve that the technical problems, that the existing MOFs have poor water stability, is unstable in an aqueous solution, and therefore may structurally collapse. In addition, the micropore characteristics of most MOFs have affected the mass transfer rate of the adsorbate, which in turn limits the industrial application thereof.

The method for preparing an acid-resistant Zr-MOF material with selective adsorption of hexavalent chromium of the present invention is carried out according to the following steps:

thoroughly mixing a carboxylic acid ligand containing a triazine group and a zirconium salt together in an organic solvent, adding formic acid thereto, then reacting same under closed conditions at 80-150° C. for 12-72 h, subjecting the product to solid-liquid separation, then drying the solid to obtain a colorless transparent single crystal which is the Zr-MOF;

where the carboxylic acid ligand containing a triazine group is 2,4-bis(3,5-dicarboxyphenylamino)-6-ol triazine ($H_4BDPO$);

a molar ratio of the carboxylic acid ligand containing a triazine group to the zirconium element in the zirconium salt is 1:(0.5-2);

a ratio of the mole of the carboxylic acid ligand containing a triazine group to the volume of the formic acid is 1 mmol:(100-110 mL);

a volume ratio of the formic acid to the organic solvent is 1:(0.5-1.5).

In the present invention, the addition of formic acid has an effect of competition coordination to regulate the crystallization process. The formic acid also has a carboxyl and also has a coordination ability. Thus, the formic acid competes for coordination with $H_4BDPO$ and slows down the reaction of the $H_4BDPO$ ligand with the metal. However, the formic acid has only one carboxyl, so the coordinated formic acid will be replaced by an $H_4BDPO$ ligand with a stronger coordination ability. Therefore, compared with only $H_4BDPO$ ligand, the addition of the formic acid can reduce the reaction rate as much as possible during the crystal growth, so as to obtain a single crystal product.

In the present invention, Zr is used as the metal center because the Zr—O bond is stronger, and compared with other types of MOFs, the Zr-based MOF has better water stability.

In the present invention, $H_4BDPO$ is used as the ligand: firstly, the triazine group is used as a functional group to selectively adsorb hexavalent chromium; secondly, a longer ligand is used to facilitate the construction of larger pores; thirdly, the weak acid and weak base buffer pairs on the ligand will enable the overall material to have a better ability to deal with the acidic environment.

The present invention discloses a method for preparing Zr-based MOF, by using a carboxyl ligand with a triazine group for fictionalization to coordinate with a $Zr^{4+}$ metal ion and thus constructing a MOF with excellent water stability and acid resistance, showing a strong adaptability and great potential in treating mostly acidic industrial wastewater. The MOF has mesoporous channels, which facilitates the acceleration of the mass transfer rate. As a new water treatment functional material, the MOF has optimal selective adsorption capacity and a desirable adsorption capacity for hexavalent chromium in water. The adsorption capacity reaches 113 mg/g, which improves the recycling and later resource utilization

DETAILED DESCRIPTION

Specific Implementation 1: this implementation relates to a method for preparing an acid-resistant Zr-MOF material with selective adsorption of hexavalent chromium, and in particular, the method is carried out according to the following steps:

thoroughly mixing a carboxylic acid ligand containing a triazine group and a zirconium salt together in an organic solvent, adding formic acid thereto, then reacting same under closed conditions at 80-150° C. for 12-72 h, subjecting the product to solid-liquid separation, then drying the solid to obtain a colorless transparent single crystal which is the Zr-MOF;

where the carboxylic acid ligand containing a triazine group is 2,4-bis(3,5-dicarboxyphenylamino)-6-ol triazine ($H_4BDPO$);

a molar ratio of the carboxylic acid ligand containing a triazine group to the zirconium element in the zirconium salt is 1:(0.5-2);

a ratio of the mole of the carboxylic acid ligand containing a triazine group to the volume of the formic acid is 1 mmol:(100-110 mL);

a volume ratio of the formic acid to the organic solvent is 1:(0.5-1.5).

Specific Implementation 2: this implementation is different from Specific Implementation 1 in that the zirconium salt is one or a mixture of several of $ZrCl_4$, $ZrOCl_2 \cdot 8H_2O$, $Zr(NO_3)_4$ and $Zr(SO_4)_2$. Others are the same as those in Specific Implementation 1.

Specific Implementation 3: this implementation is different from Specific Implementation 1 or Specific Implementation 2 in that the organic solvent is one or a mixture of several of $C_2H_5OH$, $CH_3OH$, DMF, DMA and DMSO. Others are the same as those in Specific Implementation 1 or 2.

Specific Implementation 4: this specific implementation is different from one of Specific Implementations 1 to 3 in that the drying is conducted at 65° C. Others are the same as those in one of Specific Implementation 1 to 3.

Specific Implementation 5: this implementation is different from Specific Implementation 4 in that the solid-liquid separation is done by means of suction filtration. Others are the same as those in Specific Implementation 4.

Figure 1:
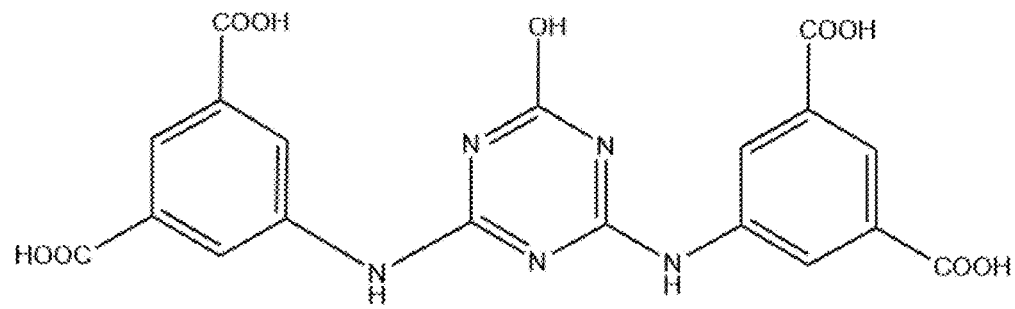
FIG. 1 is a schematic diagram of the structure of a carboxylic acid ligand containing a triazine group in Experiment 1.

The following experiments were used to verify the present invention:

Experiment 1: this experiment is a method for preparing an acid-resistant Zr-MOF material with selective adsorption of hexavalent chromium, and the method was carried out according to the following steps:

thoroughly mixing 135 mg of a carboxylic acid ligand containing a triazine group and 75 mg of anhydrous $ZrCl_4$ together in 30 mL of DMF, adding 30 mL of formic acid thereto, then reacting same under closed conditions at 120° C. for 72 h, subjecting the product to suction filtration, then drying the filter cake to obtain a colorless transparent single crystal which is the Zr-MOF.

where the carboxylic acid ligand containing a triazine group is 2,4-bis(3,5-dicarboxyphenylamino)-6-ol triazine ($H_4BDPO$), and the structure thereof is shown in FIG. 1.

FIG. 1 is a schematic diagram of the structure of a carboxylic acid ligand containing a triazine group in Experiment 1. This ligand not only introduces a triazine group into the MOF, but also constructs the MOF with a mesoporous property by means of its own long ligand property. The buffer pair provided on this ligand also allows the Zr-MOF prepared in Experiment 1 to have high resistance to acidic conditions.

Figure 2:
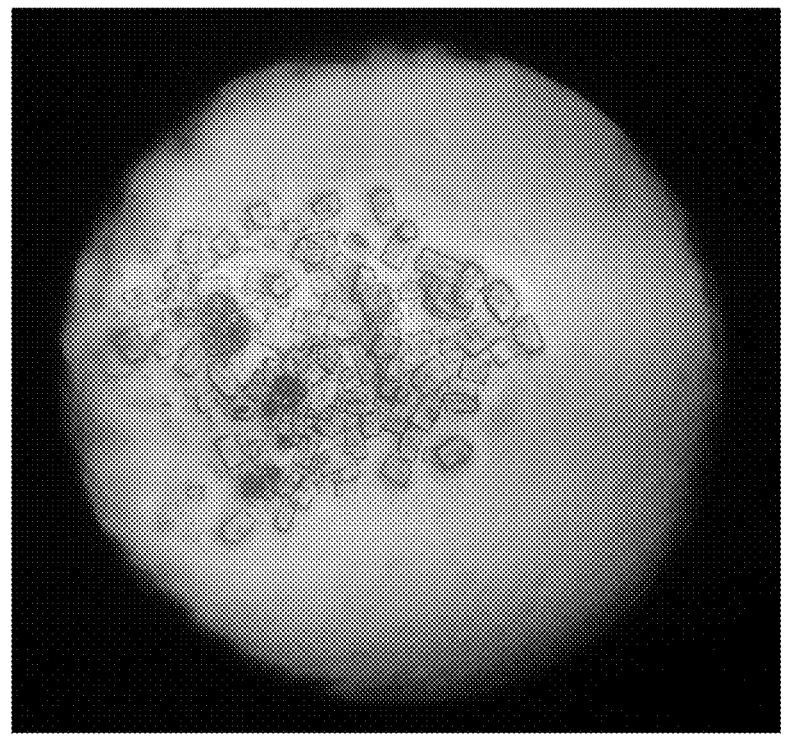
FIG. 2 is a crystal morphology of the Zr-MOF prepared in Experiment 1 under a microscope with a 40 times magnification.

FIG. 2 is a crystal morphology of the Zr-MOF prepared in Experiment 1 under a microscope with a 40 times magnification, suggesting that the preparation method of this experiment is stable and efficient.

Figure 3:
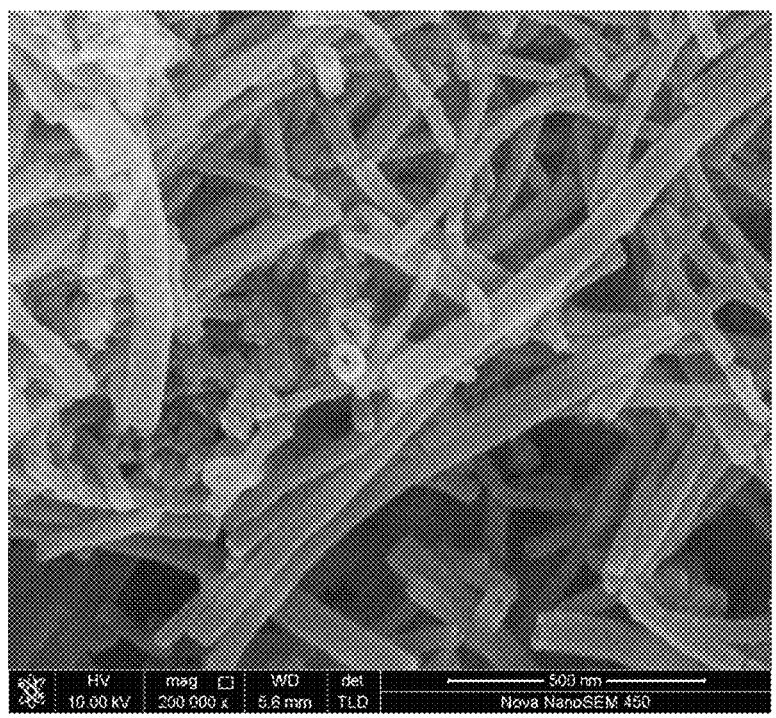
FIG. 3 is an SEM of the Zr-MOF material prepared in Experiment 1.
Figure 4:
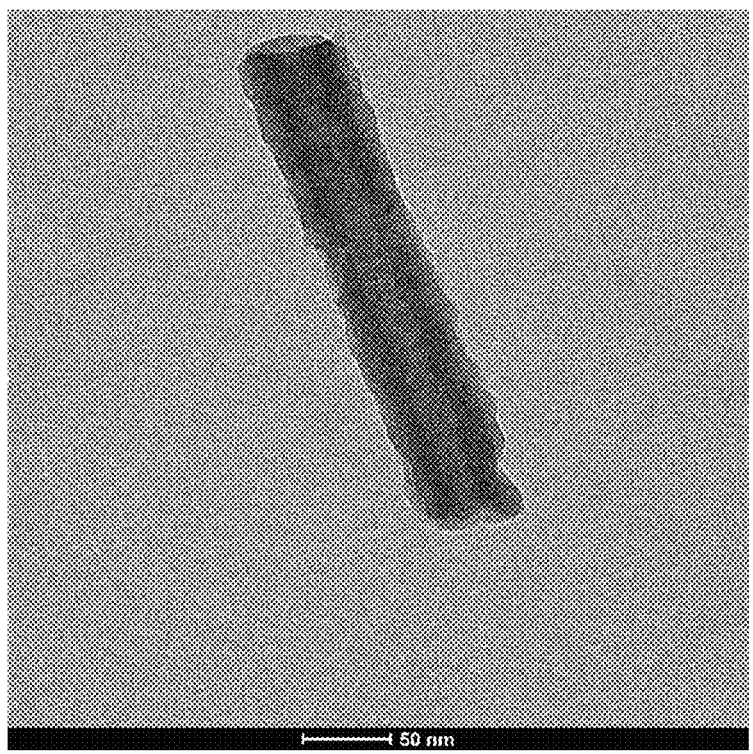
FIG. 4 is a TEM image of the Zr-MOF material prepared in Experiment 1.

FIG. 3 and FIG. 4 are the SEM and TEM images of the Zr-MOF material prepared in Experiment 1, respectively. It can be seen from the figures that the Zr-MOF is of a tubular structure with a pore size of 2-50 nm. Thus, the structure has microscope channels, which facilitates the acceleration of mass transfer.

Experiment 2: this experiment is to evaluate the water stability and acid resistance of the Zr-MOF:

two 100-mL beakers were prepared and 50 mL of deionized water was added to each beaker. The pHs of the aqueous solutions in the two beakers were adjusted with nitric acid to pH=7 and pH=1, respectively. Two 20 mg Zr-MOFs prepared in Experiment 1 were weighed in two beakers, respectively and soaked for one week. After one week, the material was separated and its XRD image was examined.

Figure 5:
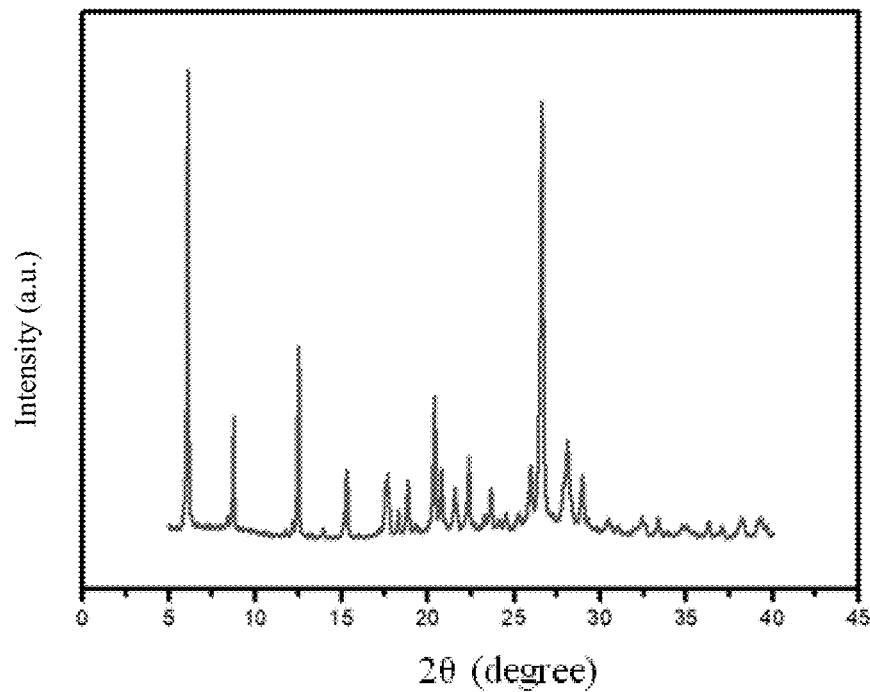
FIG. 5 is an XRD image of the Zr-MOF prepared in Experiment 1.
Figure 6:
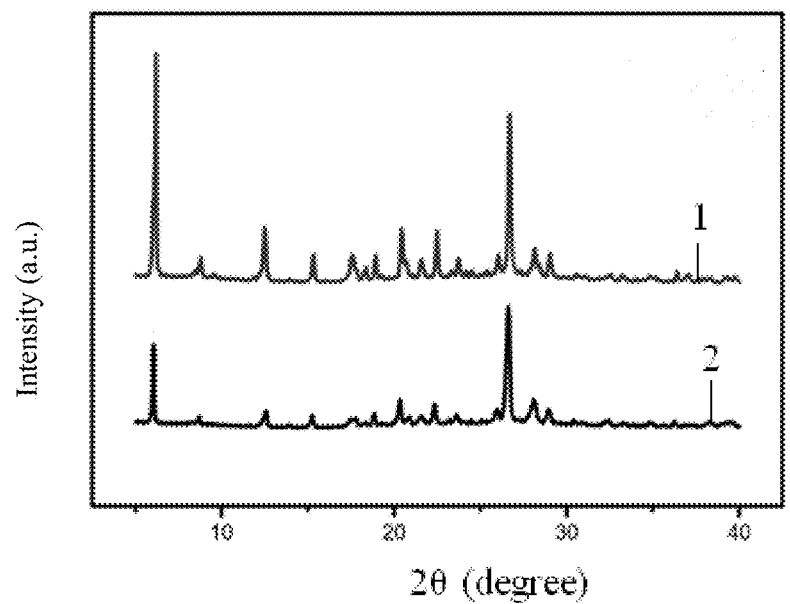
FIG. 6 is an XRD image in Experiment 2.

FIG. 5 is an XRD image of the Zr-MOF prepared in Experiment 1. FIG. 6 is an XRD image, where curve 1 is the material after having been soaked for one week under the conditions of pH=1 in Experiment 1 and curve 2 is the material after having been soaked for one week under the conditions of pH=7 in Experiment 2. It can be seen that the XRD diffraction pattern basically remained unchanged, proving the excellent water stability and acid resistance of the Zr-MOF.

Experiment 3: this experiment is to evaluate the adsorption capacity of the Zr-MOF:

Nine 50-mL aqueous solutions of $Sb^{5+}$, $Sb^{3+}$, $Bi^{3+}$, $Co^{2+}$, $Ni^{2+}$, $Pb^{2+}$, $Cu^{2+}$, and $Cr^{6+}$ with a metal ion concentration of 200 mg/L were prepared, respectively, and placed in respective sample vials. 20 mg of the Zr-MOF material prepared in Experiment 1, as an adsorbent, was added to each vial. Then, all the vials were shaken at a constant temperature of 25° C. for 2 h. Finally, the heavy metal ion concentration of the supernatant in each sample in is examined and the adsorption capacity can be obtained by calculation.

Figure 7:
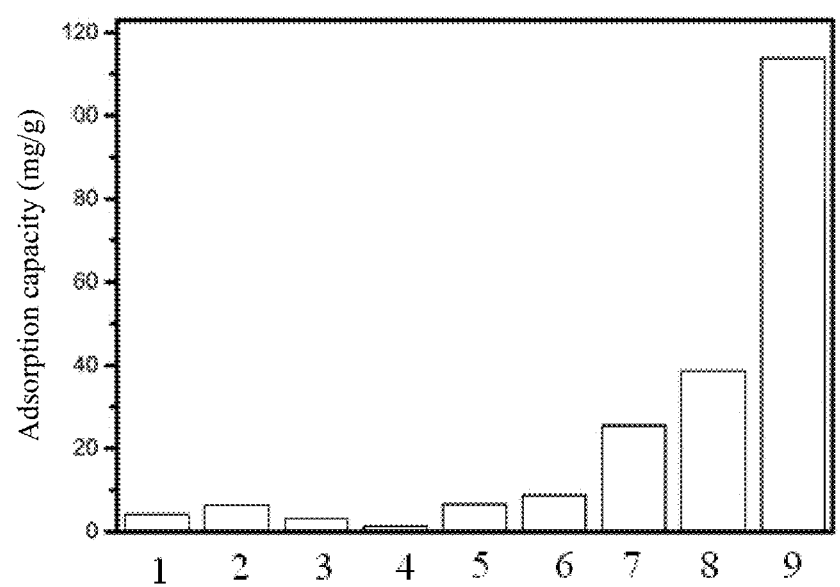
FIG. 7 is a graph of the adsorption experimental data in Experiment 3.

FIG. 7 is a graph of the adsorption experimental data in Experiment 3; where 1 is $Sb^{5+}$, 2 is $Sb^{3+}$, 3 is $Bi^{3+}$, 4 is $Co^{2+}$, 5 is $Ni^{2+}$, 6 is $Cd^{2+}$, 7 is $Pb^{2+}$, 8 is $Cu^{2+}$, 9 is $Cr^{6+}$. It can be seen from the figure that the Zr-MOF material prepared in Experiment 1 not only has a higher adsorption capacity (113 mg/g) for $Cr^{6+}$, but also has a strong selective adsorption. This feature shows that the Zr-MOF material prepared in Experiment 1 has a great potential in the adsorption treatment of $Cr^{6+}$-containing water and the later recycling of Cr.

What is claimed is:

1. A method for preparing an acid-resistant Zr-metalorganic framework (Zr-MOF) material with selective adsorption of hexavalent chromium, wherein the method for preparing an acid-resistant Zr-MOF material with selective adsorption of hexavalent chromium is carried out according to the following steps:

thoroughly mixing a carboxylic acid ligand containing a triazine group and a zirconium salt together in an organic solvent, adding formic acid thereto, then reacting same under closed conditions at 80-150° C. for 12-72 h, subjecting the product to solid-liquid separation, then drying the solid to obtain a colorless transparent single crystal which is the Zr-MOF;

wherein the carboxylic acid ligand containing a triazine group is 2,4-bis(3,5-dicarboxyphenylamino)-6-ol triazine;

a molar ratio of the carboxylic acid ligand containing a triazine group to the zirconium element in the zirconium salt is 1:(0.5-2);

a ratio of the mole of the carboxylic acid ligand containing a triazine group to the volume of the formic acid is 1 mmol:(100-110 mL);

a volume ratio of the formic acid to the organic solvent is 1:(0.5-1.5).

2. The method for preparing an acid-resistant Zr-MOF material with selective adsorption of hexavalent chromium according to claim 1, wherein the zirconium salt is one or a mixture of several of $ZrCl_4$, $ZrOCl_2 \cdot 8H_2O$, $Zr(NO_3)_4$ and $Zr(SO_4)_2$.

3. The method for preparing an acid-resistant Zr-MOF material with selective adsorption of hexavalent chromium according to claim 1, wherein the organic solvent is one or a mixture of several of $C_2H_5OH$, $CH_3OH$, DMF, DMA and DMSO.

4. The method for preparing an acid-resistant Zr-MOF material with selective adsorption of hexavalent chromium according to claim 1, wherein the drying is conducted at 65° C.

5. The method for preparing an acid-resistant Zr-MOF material with selective adsorption of hexavalent chromium according to claim 1, wherein the solid-liquid separation is done by means of suction filtration.

* * * * *